United States Patent [19]

Jimbo et al.

[11] Patent Number: 4,792,736
[45] Date of Patent: Dec. 20, 1988

[54] CONTROL APPARATUS FOR ELECTRIC VEHICLES

[75] Inventors: Yoshiji Jimbo; Seiki Amikura, both of Katsuta, Japan

[73] Assignee: Hitachi, Ltd., Tokyo, Japan

[21] Appl. No.: 52,882

[22] Filed: May 22, 1987

[51] Int. Cl.⁴ .............................................. H02P 7/06
[52] U.S. Cl. ................... 318/338; 318/376; 318/139
[58] Field of Search ......... 363/124, 132, 136; 318/338, 375, 376, 377–381, 139, 599, 339–340

[56] References Cited

U.S. PATENT DOCUMENTS

| | | | |
|---|---|---|---|
| 3,569,811 | 3/1971 | Miller et al. | 318/367 |
| 3,984,743 | 10/1976 | Horie | 318/375 |
| 4,095,154 | 6/1978 | Williamson | 318/376 |
| 4,124,812 | 11/1978 | Naito et al. | 318/367 |
| 4,267,492 | 5/1981 | Manners | 318/139 |
| 4,401,927 | 8/1983 | Thuy | 318/379 |
| 4,424,558 | 1/1984 | N'Guyen Uyen | 363/124 |

Primary Examiner—William M. Shoop, Jr.
Assistant Examiner—David S. Martin
Attorney, Agent, or Firm—Antonelli, Terry & Wands

[57] ABSTRACT

There are provided a first chopper CH1 connected in parallel with armatures M1, M2 of main motors of an electric vehicle and operating during a braking mode, and a second chopper CH2 connected in series with the armatures and operating during a powering mode. Both the choppers have a reverse-directional conductivity. A third chopper FCH is further provided to control a field current of the main motors. According to this invention, an arrangement of a main circuit of the electric vehicle is not necessary to be switched over, even though the operation mode thereof is changed. Further, compared with the prior art, the number of the choppers used decreases, so that an economical control apparatus for the electric vehicle can be realized.

6 Claims, 3 Drawing Sheets

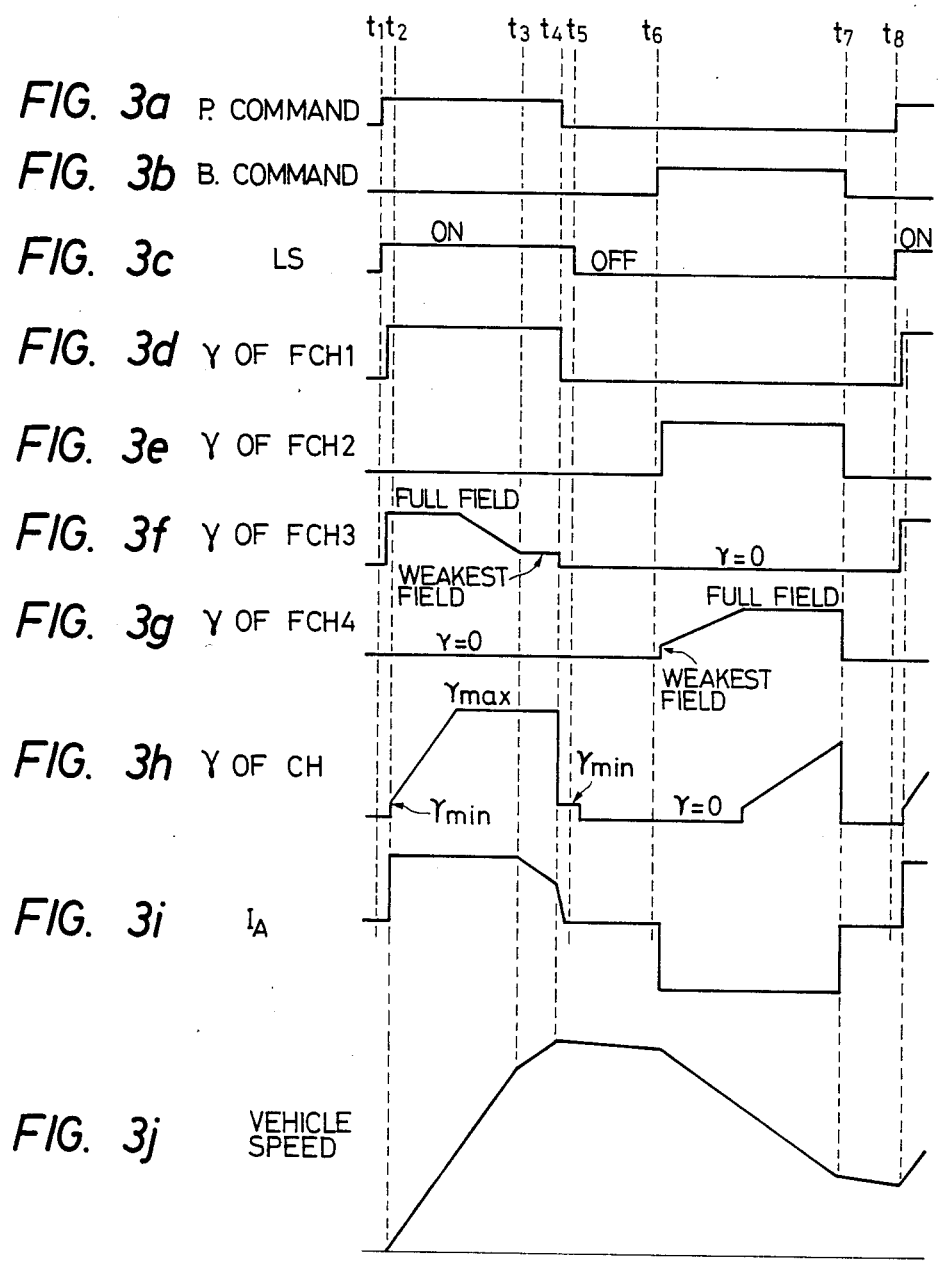

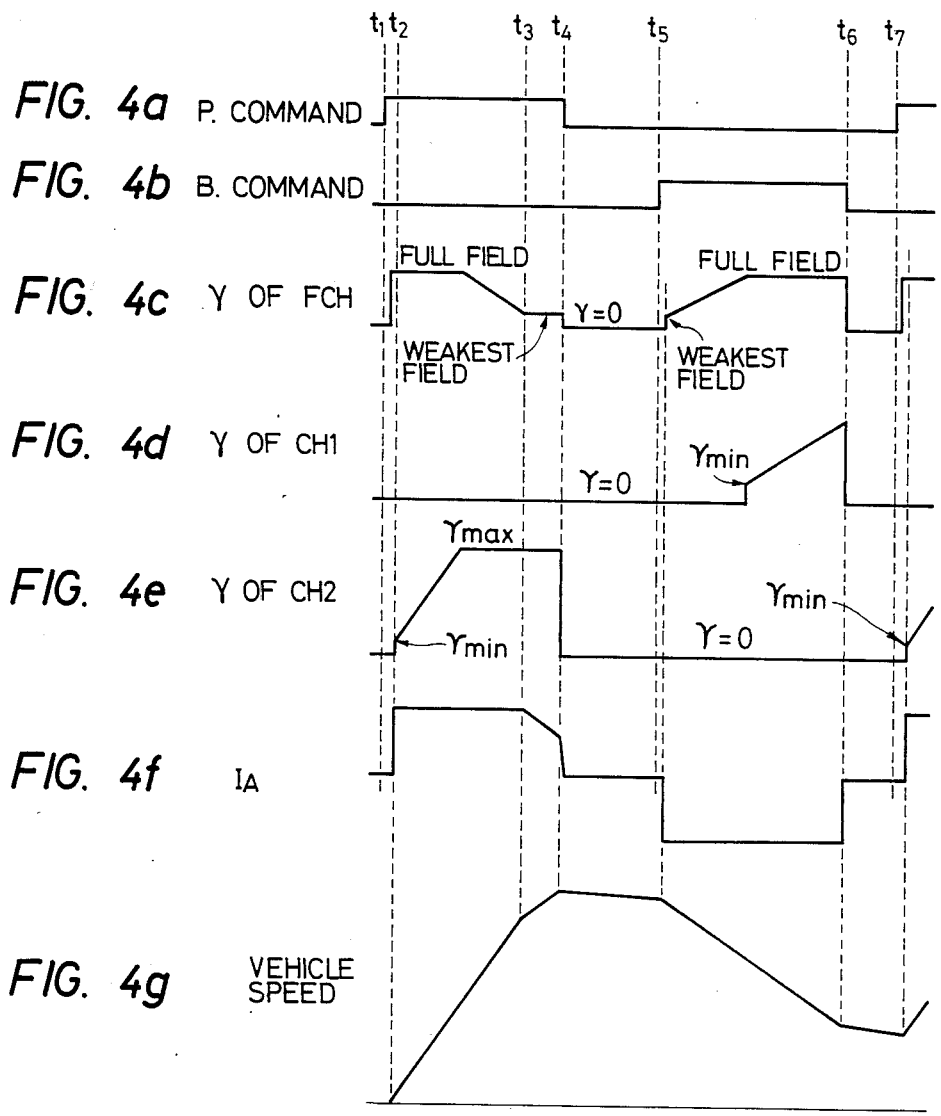

CONTROL APPARATUS FOR ELECTRIC VEHICLES

BACKGROUND OF THE INVENTION

1. Field of The Invention

The present invention relates to an apparatus for controlling an electric vehicle, and more particularly to an control apparatus for an electric vehicle driven by chopper-controlled electric motors.

2. Description of The Related Art

In an electric vehicle having chopper-controlled driving or traction motors, the control of both powering and braking operations is carried out by a common chopper. A control apparatus for such an electric vehicle is disclosed in Hitachi Review Vol. 33 (1984), No. 1, pp. 11 to 13. According to the apparatus disclosed therein, there is provided a line switch for changing over a main circuit of the electric vehicle from the circuit arrangement for powering to that for braking, and vice versa. For example, when a powering command occurs, the line switch is closed to form the circuit arrangement for powering, and when a braking command occurs, it is opened to change over the main circuit to the arrangement for braking.

By the way, when an electric vehicle is subjected to a so-called automatic train operation (ATO) control, the vehicle is controlled so as to make its speed follow a predetermined speed pattern, in which a running mode of the vehicle is often changed repeatedly between the powering and the braking operations. The line switch must operate every time the running mode changes, i.e., whenever the command thereof is changed.

The line switch must be operated under the condition that the current of the main circuit is zero. On the other hand, because of inductance of the main circuit, the current flowing therethrough does not become zero at once when the conduction ratio $\gamma$ of the chopper is made zero in response to removal of the powering command. Therefore, an instruction of opening the line switch, which is generated when the main circuit current is detected to be zero, is delayed. In addition, as is well known, the line switch itself has a time delay in its operation. As a result, the actual opening of the line switch is considerably delayed from the disappearance of the powering command.

Therefore, even though the braking command occurs just after the disappearance of the powering command, the construction of the circuit arrangement for braking and therefore the start of braking is delayed. In the ATO-controlled electric vehicle as described above, the time delay in the start of braking becomes a serious problem, because it remarkably damages the followability of the vehicle speed to the predetermined speed pattern.

SUMMARY OF THE INVENTION

An object of the present invention is to provide a control apparatus for an electric vehicle, in which any change of a main circuit araangement of the electric vehicle is not necessitated even when the running mode of the electric vehicle changes.

A feature of the present invention is that there are provided a first chopper having the reverse-directional conductivity which operates during a braking mode of an electric vehicle and through which a main motor is short-circuited when the first chopper is turned on and a second chopper having the reverse-directional conductivity which controls a current flowing through the main motor during a powering mode of the electric vehicle.

With the present invention, the change of a running mode of an electric vehicle can be carried out without any changeover of a main circuit arrangement of the electric vehicle. In the case of the application of the present invention to an ATO-controlled electric vehicle, therefore, the followability of the vehicle speed to a predetermined speed pattern is much improved, since the quick change from the powering operation to the braking operation becomes possible.

BRIEF DESCRIPTION OF THE DRAWINGS

FIGS. 3a–3j show the change of various signals or quantities during the operation of the prior art shown in FIG. 1; and FIGS. 4a–4g show the change of various signals or quantities during the operation of the embodiment shown in FIG. 2.

DESCRIPTION OF THE PREFERRED EMBODIMENTS

Preceding the explanation of an embodiment of the present invention, the description will be made of the prior art and its problems in detail, referring to FIGS. 1 and 3.

Figure 1:
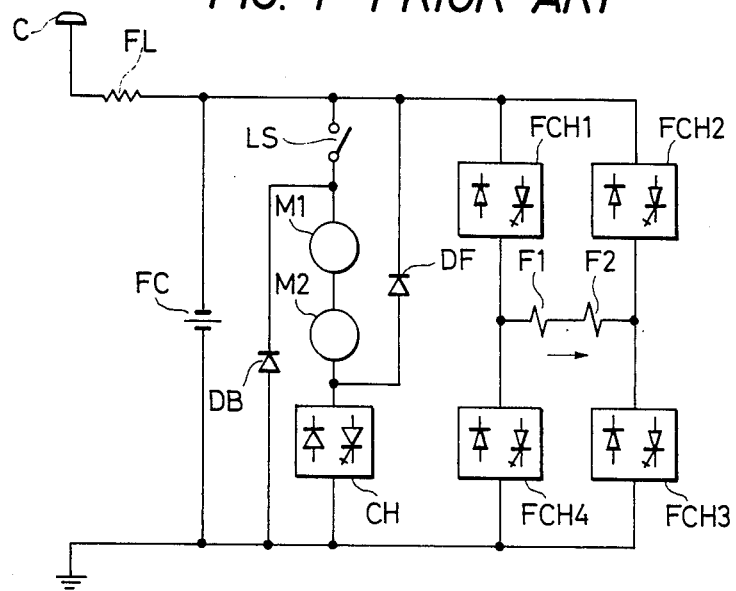
FIG. 1 is a diagram schematically showing a circuit arrangement of a control apparatus for a chopper-controlled electric vehicle according to the prior art.

In FIG. 1, reference symbol C denotes a collector contacting a trolley wire (not shown) and collecting electric power into an electric vehicle therefrom. Between the collector C and the ground, there is provided a filter consisting of a filter reactor FL and a filter capacitor FC. In parallel with the filter is connected a field circuit of main traction motors of the electric vehicle, which is formed as described in the following. Further, in the figure, there is shown a case of two main motors. It is to be understood, however, that the number of the main motors has nothing to do with the essence of the present invention.

The field circuit is composed of four field choppers FCH1 to FCH4 connected in a bridge circuit and series-connected field windings F1, F2 of the main motors, which are connected so as to bridge junctions of two series connections of the choppers FCH1 and FCH4, and FCH2 and FCH3. In the thus constructed field circuit, a field current flows in the direction as shown by an arrow in the figure, when the choppers FCH1, FCH3 are controlled and the choppers FCH2, FCH4 are kept off. To the contrary, when the choppers FCH1, FCH3 are made off and the choppers FCH2, FCH4 are controlled, the field current is reversed. As will become apparent later, the switchover of the operation of the field choppers is conducted in the case where the running mode or direction of the electric vehicle is changed.

The field choppers FCH1 to FCH4 used herein have the reverse-directional conductivity. Namely, each chopper can control its forward current by controlling a so-called conduction ratio $\gamma$ thereof, on the one hand and freely pass a current flowing in the reverse direction, on the other hand. Such a chopper circuit is already known and can be constructed by usual gate turn-off thyristors. With respect to this, the same is true of a chopper CH described later.

An armature circuit of the main motors as described below is further connected in parallel with the filter. Namely, a line switch LS, armatures M1, M2 of the main motors and a chopper CH are connected in series to form the armature circuit. In the thus formed armature circuit, a part thereof, i.e., a serial connection of the line switch LS and the armatures M1, M2, is provided with a parallel-connected diode DF, which operates as a freewheel diode during a powering operation of the electric vehicle. Further, in parallel with another part thereof, i.e., a serial connection of the armatures M1, M2 and the chopper CH, a second diode DB is connected, which operates as a freewheel diode during a braking operation of the electric vehicle. Moreover, the armatures M1 and M2 correspond to the field windings F1 and F2, respectively.

In the thus constructed main circuit, if the line switch LS is closed, the circuit arrangement for powering is constructed. Namely, the armatures M1, M2 are connected to the trolley wire through the collector C. Then, if the chopper CH is turned on, DC voltage of the trolley wire is applied to the main motors so that an armature current $I_A$ flows from the collector C to the ground through the line switch LS and the chopper CH.

If the chopper CH is turned off, the DC voltage applied to the main motors is removed and the armature current circulates through the freewheel diode DF. If, therefore, the conduction ratio $\gamma$ of the chopper CH is varied, the voltage applied to the armatures M1, M2 and therefore the armature current $I_A$ can be controlled. Usually, the armature current $I_A$ is controlled so as to follow a predetermined reference of the armature current for powering.

On the contrary, if the line switch LS is opened, the circuit arrangement for braking is formed. At that time, if the vehicle speed is higher than its rated value, the armatures M1, M2 induce the voltage higher than that of the trolley wire. Therefore, the armature current $I_A$ must be controlled by the field weakening control to be maintained at a predetermined reference of the armature current for braking.

If, however, the vehicle speed decreases to become lower than the rated value, the armature current can no longer flow with the induced voltage of the armatures M1, M2. In such a condition, the chopper CH starts to be controlled. Namely, when the chopper CH is turned on, the armature current $I_A$ is short-circuited through the chopper CH and the diode DB.

After that, if the chopper CH is turned off, the armature current $I_A$ flows toward the trolley wire through the diode DF due to the effect of the inductance existing in the armatures M1, M2. If the conduction ratio $\gamma$ of the Chopper CH is varied, the armature current $I_A$ can be controlled to follow the predetermined reference. In this manner, the electric vehicle is subjected to a regeneration brake.

In the following, the operation of the control apparatus described above will be explained, referring to FIG. 3.

Assuming that a powering command is given to the control apparatus at time point $t_1$ (cf. FIG. 3a), the line switch LS is closed (cf. FIG. 3c). After closure of the line switch LS, the chopper FCH1 is made completely conductive and kept at that state thereafter (cf. FIG. 3d). In the chopper FCH3, a conduction ratio $\gamma$ thereof is brought into such a value that the full field state is caused in the main motors (cf. FIG. 3f). Namely, the chopper FCH3 begins an on-off operation from this time point, so that a field current flows through the field windings F1, F2, as shown by an arrow in FIG. 1. Generally, the conduction ratio $\gamma$ of the chopper FCH3 is set so as to be about 50 per cent when the main motors are under the full field condition.

After that, i.e., from time point $t_2$, the chopper CH starts an on-off operation, and a conduction ratio $\gamma$ thereof is increased from its minimum (e.g. 10 per cent) to its maximum (e.g., 95 per cent) in accordance with a deviation of the armature current reference for powering and the actual armature current IA (cf. FIG. 3h). As a result, the armature current $I_A$ follows the reference thereof and is maintained constant (cf. FIG. 3i) so that the electric vehicle is accelerated at a constant acceleration (cf. FIG. 3j).

When the conduction ratio $\gamma$ of the chopper CH reaches its maximum, then the conduction ratio $\gamma$ of the chopper FCH starts to be reduced, while the conduction ratio $\gamma$ of the chopper CH is kept at its maximum (cf. FIGS. 3f and 3h). As a result, the armature current $I_A$ is still maintained constant (cf. FIG. 3i), whereby the electric vehicle continues to accelerate with the constant power (cf. FIG. 3j). Namely, during this, the main motors are subjected to the field weakening control.

After the field becomes weakest at time point $t_3$, the conduction ratio $\gamma$ of the chopper FCH3 is maintained at the corresponding value (cf. FIG. 3f). In this region of speed, the electric vehicle is accelerated in accordance with the characteristics of the main motors (cf. FIG. 3j). As the vehicle speed increases, a counter electromotive force of the main motors also increases and therefore the armature current $I_A$ decreases accordingly (cf. FIG. 3i).

If the powering command disappears at time point $t_4$ (cf. FIG. 3a), the conduction ratio $\gamma$ of the field choppers FCH1, FCH3 are made zero (cf. FIGS. 3d and 3f) and that of the chopper CH is reduced down to its minimum (cf. FIG. 3h), so that the armature current $I_A$ decreases in accordance with a time constant of the main circuit (cf. FIG. 3i). When it is detected that the armature current $I_A$ becomes zero, the line switch LS is opened at time point $t_5$ (cf. FIG. 3d), and thereafter the conduction ratio $\gamma$ of the chopper CH is made zero.

By the way, in the prior art, the chopper CH is first made completely non-conductive, after the line switch LS is opened. This is to protect the chopper CH from the high voltage which may be abnormally induced by means of the inductance of the main circuit, if the main circuit is made open by the chopper CH itself. Usually, the duration from the time, at which the powering command disappears, to the time, at which the conduction ratio $\gamma$ is made zero, is provided at about 100 msec., taking account of a delay in the operation of the line switch LS itself.

Next, let's assume that a braking command is given to the control apparatus at time point $t_6$ (cf. FIG. 3b). The field current of the main motors is made to flow in the direction opposite to that as shown by the arrow in FIG. 1 by operating the field choppers FCH2, FCH4. Namely, the chopper FCH2 is made completely conductive (cf. FIG. 3e), and a conduction ratio $\gamma$ of the field chopper FCH4 is controlled from the value corresponding to the weakest field (cf. FIG. 3g). This is because the vehicle speed is higher than its rated value, and therefore the armature current $I_A$ must be controlled to follow the armature current reference for braking by weakening the field of the main motors.

As the vehicle speed decreases (cf. FIG. 3j) and the counter electromotive force of the main motors becomes small accordingly, the field of the main motors must be increased in order to keep the constant armature current $I_A$. Therefore, the conduction ratio $\gamma$ of the chopper FCH4 is increased toward that corresponding to the full field (cf. FIG. 3g), so that the armature current $I_A$ follows the reference thereof (cf. FIG. 3i).

When the vehicle speed decreases down to less than its rated value, at which speed, even though the main motors are under the full field condition, the counter electromotive force of the main motors becomes lower than the voltage of the trolley wire, then the conduction ratio $\gamma$ of the chopper CH begins to be controlled from its minimum value toward its maximum (cf. FIG. 3h), so that the armature current $I_A$ follows the reference thereof and is maintained constant (cf. FIG. 3i). As a result, the electric vehicle is decelerated at a constant deceleration (cf. FIG. 3j).

If the braking command disappears at time point $t_7$, the conduction ratios $\gamma$ of the choppers CH, FCH2 and FCH3 are all returned to zero, so that the armature current $I_A$ also becomes zero. If the powering command occurs again, the line switch LS is closed and the same operation as mentioned above is repeated.

In the following, the problems of the above described prior art will be discussed. As is easily understood from the above described operation, in the prior art, there is provided the line switch LS which must be operated every time the running mode of the electric vehicle is changed. With respect to the operation of the line switch LS, there must be provided a dead time, 100 msec., for example, as described above, from the time, at which the powering command disappears, and to the time, at which the conduction ratio $\gamma$ is made zero.

Because of this dead time, even if the braking command occurs just after the disappearance of the powering command, the circuit arrangement for braking can not be prepared immediately, so that the start of braking is delayed. As already described in the description of the related art, this delay of the braking operation becomes a serious problem, especially in an ATO-controlled electric vehicle.

Further, four field choppers are used in the prior art in order to reverse the direction of the field current when the running mode is changed. When the powering command occurs just after disappear of the braking command, the reversing of the field current must be quickly carried out. This means that the field current flowing in the direction opposite to that of the arrow shown in FIG. 1 is interrupted and the field current in the direction as shown by the arrow is made to flow immediately. To this end, four choppers having the reverse-directional conductivity are utilized in the prior art shown. The use of many choppers makes the control apparatus costly.

Figure 2:
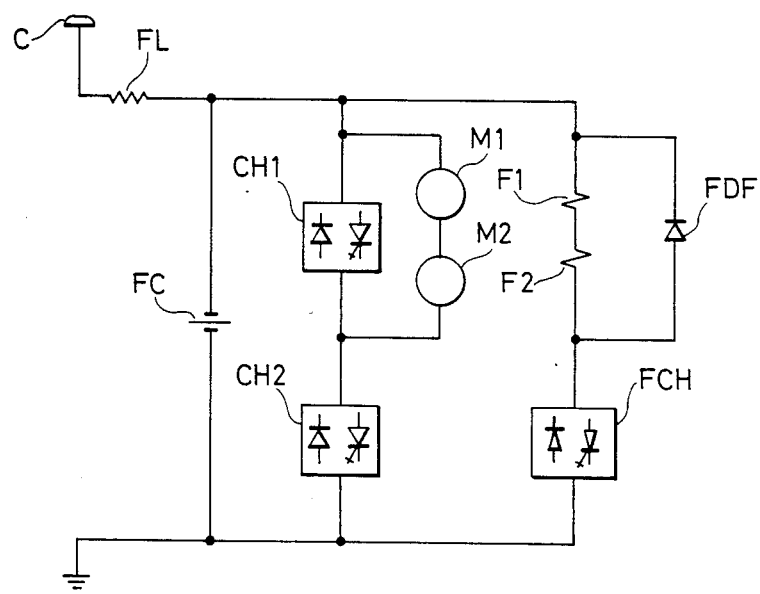
FIG. 2 is a diagram schematically showing a circuit arrangement of a control apparatus in accordance with an embodiment of the present invention.

Referring now to FIGS. 2 and 4, the embodiment of the present invention will be explained in the following.

In FIG. 2, the same parts are represented by the same reference symbols as in FIG. 1. According to the present embodiment, there is provided a first chopper CH1 which is coupled in parallel with the armatures M1, M2 and operates during the braking operation mode of the electric vehicle. Further, a second chopper CH2 is connected in series with the chopper CH1 and the armatures M1, M2, which controls the armature current flowing through the armatures M1, M2 during the powering operation mode of the vehicle. Both the choppers CH1, CH2 have the reverse-directional conductivity, similarly to the choppers used in the prior art.

The field current is controlled by a single chopper FCH, which is connected in series with the field windings F1, F2. In parallel with the field windings F1, F2, there is provided a diode FDF, which functions as a freewheel diode for the field current. Further, although there is actually provided a reverser for reversing the field current when the running direction of the electric vehicle is changed, it is omitted here in the figure, since it has no particular relation to the essence of the present invention. Moreover, the field chopper FCH is shown in the figure as if it is a chopper having the reverse-directional conductivity. The field chopper FCH in the present invention is not always necessary to have the reverse-directional conductivity.

Referring next to FIG. 4, the explanation will be done of the operation of the embodiment described above.

Assuming that the powering command is given to the control apparatus at time point $t_1$ (cf. FIG. 4a), a conduction ratio $\gamma$ of the chopper FCH is brought into a value corresponding to the full field of the main motors (cf. FIG. 4c). Thereafter, at time point $t_2$, the conduction ratio $\gamma$ of the chopper CH2 starts to be controlled from its minimum (cf. FIG. 4e).

When the chopper CH2 is turned on, DC voltage is applied to the armatures M1, M2 so that the armature current $I_A$ flows through a circuit of the collector C, the armatures M1, M2 and the chopper CH2. Thereafter, when the chopper CH2 is turned off, the armature current $I_A$ circulates through the chopper CH1 having the reverse-directional conductivity. That is, the reverse-directional conductivity of the chopper CH1 is used for freewheeling the armature current $I_A$ when the chopper CH2 is turned off. Therefore, similarly to the prior art, the armature current $I_A$ can be controlled by varying the conduction ratio $\gamma$ of the chopper CH2.

The conduction ratio $\gamma$ of the chopper CH2 is gradually increased from its minimum toward its maximum in accordance with a deviation of the reference of the armature current and the actual value $I_A$ thereof (cf. FIG. 4e). As a result, the armature current $I_A$ follows the reference thereof and is maintained constant (cf. FIG. 4f), so that the electric vehicle can be accelerated at a constant acceleration (cf. FIG. 4g).

Similarly to the case in the prior art, when the conduction ratio $\gamma$ of the chopper CH2 reaches its maximum, the conduction ratio $\gamma$ of the chopper FCH is gradually reduced (cf. FIG. 4c), while holding the former at the maximal conduction ratio (cf. FIG. 4e). Namely, in this duration, the field weakening control of the main motors is carried out. Thereby, the armature current $I_A$ continues to be maintained constant (cf. FIG. 4f), and the electric vehicle still continues to be accelerated with the constant power (cf. FIG. 4g).

After the field of the main motors becomes weakest at time $t_3$, the conduction ratio $\gamma$ of the chopper FCH is maintained at the value corresponding to the weakest field (cf. FIG. 4c). In this region of speed, the electric vehicle is accelerated in accordance with the characteristics of the main motors (cf. FIG. 4g), and the armature current $I_A$ gradually decreases with increase of the counter electromotive force of the armatures M1, M2 (cf. FIG. 4f). Thereafter, when the powering command disappears at time point $t_4$ (cf. FIG. 4a), the conduction ratios $\gamma$ of the chopper FCH and CH2 are both made zero (cf. FIGS. 4c and 4e). Accordingly, the armature current $I_A$ becomes zero in accordance with the time constant of the main circuit (cf. FIG. 4f).

Now let's assume that the braking command occurs at time point $t_5$ and, at that time, the vehicle speed is higher than its rated value. In this case, the voltage induced by the armatures M1, M2 is higher than that of the trolley wire, and therefore the armature current $I_A$ flows through a circuit of the ground, the chopper CH2, the armatures M1, M2, the filter reactor FL and the collector C. It is to be noted that the reverse-directional conductivity of the chopper CH2 is utilized at this time. Therefore, the armature current $I_A$ is controlled to follow its reference for braking by weakening the field of the main motors. In the case shown, the field is weakened to the weakest field (cf. FIG. 4c).

As the vehicle speed decreases (cf. FIG. 4g) and the voltage induced by the main motors also decreases accordingly, the field of the main motors must be increased. Therefore, the conduction ratio $\gamma$ of the chopper FCH is increased (cf. FIG. 4c), so that the armature current $I_A$ follows the reference thereof (cf. FIG. 4f) When the vehicle speed decreases to become below its rated value and hence the voltage induced by the armatures M1, M2 becomes less than that of the trolley wire, the conduction ratio $\gamma$ of the chopper CH1 starts to be controlled (cf. FIG. 4d).

Namely, when the chopper CH1 is turned on, the armature current $I_A$ circulates through the chopper CH1. Thereafter, if the chopper CH1 is turned off, the armature current $I_A$ flows through the circuit of the ground, the chopper CH2, the armatures M1, M2, the filter reactor FL and the collector C due to the inductance of the armatures M1, M2. Also in this case, the reverse-directional conductivity of the chopper CH2 is utilized in order to make the armature current $I_A$ flow. In this manner, the armature current $I_A$ is controlled to follow its reference by controlling the conduction ratio $\gamma$ of the chopper CH1.

If the braking command disappears at time point $t_6$, the conduction ratios $\gamma$ of the choppers FCH and CH1 are made zero (cf. FIGS. 4c and 4d). Accordingly, the armature current $I_A$ becomes zero and the braking is released. Thereafter, if the powering command occurs at time point $t_7$, again, the same operation as described above is repeated.

As apparent from the comparison of FIGS. 3 and 4, since the control apparatus according to the present invention is not accompanied by the line switch LS, it is unnecessary to provide the dead time between the time when the powering command disappears and the time when the conduction ratio $\gamma$ is made zero, which must be always prepared in the prior art. Therefore, the running mode of the electric vehicle can be changed from the powering operation to the braking operation without any delay. Therefore, when the present invention is applied to an ATO-controlled electric vehicle, the followability to a speed pattern is much improved.

Further, in the present invention, a mechanical switch can be employed as a reverser for reversing the field current. In the prior art, the four choppers are used in order to reverse the field current when both the running mode and the running direction of the electric vehicle are changed. In the present invention, the field current is not necessary to be reversed even upon the change of the running mode of the electric vehicle. Therefore, cheap mechanical switches can be employed as a reverser for changing the direction of the field current, which are operated only in the stopping of the electric vehicle, and hence under no field current.

Further, since the chopper CH2 operates only during the braking operation of the electric vehicle and the chopper CH1 operates only during the powering operation thereof, the capacities of cooling devices prepared for both the choppers CH1, CH2 is sufficient to be almost equal in total to that of a cooling device for the prior art control apparatus.

Although there has been herein shown and described only one form of apparatus embodying the present invention, it is understood that various changes and modifications may be made therein within the scope of the appended claims without departing from the spirit and scope of the present invention.

We claim:

1. A control apparatus for an electric vehicle, comprising:
   at least one traction motor having an armature and a field winding for driving the electric vehicle;
   first chopper means, connected in parallel with the armature, for controlling a current flowing therethrough in the forward direction by an on-off operation thereof and for enabling current to flow freely in the reverse direction, the second chopper means being subjected to the on-off operation only during a braking operation mode of the electric vehicle; and
   second chopper means, connected in series with the parallel connection of the armature and the first chopper means, for controlling a current flowing therethrough in the forward direction by an on-off operation thereof and for enabling current to flow freely in the reverse direction, the second chopper means being subjected to the on-off operation only during a powering operation mode of the electric vehicle,
   whereby in the braking operation mode an armature current is circulated through the first chopper means when the first chopper means is turned on, and is made to flow through the second chopper means in the reverse direction when the first chopper means is turned off, and in the powering operation mode the armature current is made to flow through the second chopper means when the second chopper means is turned on, and is circulated through the first chopper means in the reverse direction when the second chopper means is turned off.

2. A control apparatus for an electric vehicle as defined in claim 1, wherein there is further provided means for controlling a current flowing through the field winding of the at least one traction motor independently of the armature current.

3. A control apparatus for an electric vehicle as defined in claim 2, wherein said field current controlling means is a third chopper means connected in series with the field winding.

4. A control apparatus for an electric vehicle as defined in claim 3, wherein a conduction ratio of said third chopper means is maintained at a value corresponding to the full field of the at least one traction motor during which a conduction ratio of said second chopper means is controlled from its minimum toward is maximum, and when the conduction ratio of said second chopper means reaches its maximum, the conduction ratio of said third chopper means is gradually decreased toward a value corresponding to the weakest field of the at least one traction motor while maintaining the conduction ratio of said second chopper means at its maximum.

5. A control apparatus for an electric vehicle as defined in claim 3, wherein when the electric vehicle is running at a speed higher than a rated speed, a conduction ratio of said third chopper means is so controlled that the at least one traction motor is under the weakening field and gradually increased so as to make the armature current follow a predetermined reference thereof while maintaining said first chopper means non-conductive, and when the conduction ratio of said third chopper means reaches a value corresponding to the full field of the at least one traction motor, the conduction ratio of said first chopper means is gradually increased toward its maximum while maintaining the conduction ratio of said third chopper means at the value corresponding to the full field of the at least one traction motor.

6. A control apparatus for an electric vehicle as defined in claim 1 wherein a plurality of traction motors, each having an armature and a field winding for driving the electric vehicle are provided.

* * * * *